May 21, 1968   G. L. RODGERS   3,384,801
CONDITION RESPONSIVE MOTOR SPEED CONTROL CIRCUITS
Original Filed March 9, 1964

INVENTOR
GERALD L. RODGERS

BY
ATTORNEY

United States Patent Office 3,384,801
Patented May 21, 1968

3,384,801
CONDITION RESPONSIVE MOTOR SPEED
CONTROL CIRCUITS
Gerald L. Rodgers, Worthington, Ohio, assignor to Ranco
Incorporated, Columbus, Ohio, a corporation of Ohio
Continuation of application Ser. No. 350,186, Mar. 9,
1964. This application Apr. 6, 1967, Ser. No. 629,032
7 Claims. (Cl. 318—334)

ABSTRACT OF THE DISCLOSURE

A heat pump system including first and second heat exchangers, a blower means operable to direct a flow of air over one of the exchangers and which includes an induction motor energized from an AC power supply to drive a blower member, and circuitry for controlling the speed of the induction motor in response to sensed temperature including a temperature sensing circuit having a temperature responsive resistor in heat exchange relationship with the one heat exchanger and operable to provide an instantaneous voltage at a point in the circuitry having an amplitude which varies according to the temperature sensed by the temperature responsive resistor, a capacitor connected in the control circuitry and charged at a rate controlled by the instantaneous voltage at the point in the sensing circuit, and semi-conductor switch means coupled to the capacitor so that the capacitor is operable to render the switch means conductive upon discharge thereof to control the speed of the induction motor in accordance with the sensed temperature.

---

This application is a continuation of United States patent application Ser. No. 350,186, filed Mar. 9, 1964, now abandoned.

This invention relates to electric motor speed controls, and more particularly to improved electronic circuit means for controlling motor speed in response to changes in a condition such as temperature.

Electric motor driven fans or blowers have been used for circulating air in refrigerators to control the temperature of zones therein, and it has been proposed heretofore to utilize thermally responsive, heated bimetal operated vibrating contact means for regulating fan motor current, and hence fan speed, in accordance with the temperature of the zone being affected by circulation of air by the fan. Such heated bimetal and vibrating contact controls are notably inefficient in that substantial amounts of electric current are lost in the generation of heat by the bimetal heater and in generation of heat because of the resistive nature of the control. In addition, such controls are relatively expensive and low in reliability.

It is a principal object of this invention to provide novel temperature responsive motor speed control circuits which are particularly reliable, notably efficient in operation and inexpensively constructed of low cost, readily available elements.

As another object this invention aims to provide novel and improved motor speed control circuits for alternating current powered electric motors, the circuits comprising rectifier or diode means for passing current to the electric motor during half cycles of one polarity and blocking current or distorting the wave shape during opposite half cycles, and semi-conductor switching means such as transistors or silicon controlled rectifiers for by-passing current around the rectifier means to the motor during a portion of each opposite half cycle, the period of blocking or distortion during the half cycles of opposite polarity being determined by R-C circuitry including a time delay capacitor and resistive temperature or other condition sensing means so that the average motor current is varied in accordance with the temperature sensed.

The invention may be further said to reside in certain constructions and combinations of elements by which the foregoing objects and advantages are achieved, as well as others as will become apparent from the following detailed description of preferred control circuits embodying the invention.

In the accompanying sheet of drawings forming a part of this specification:

Figure 1:
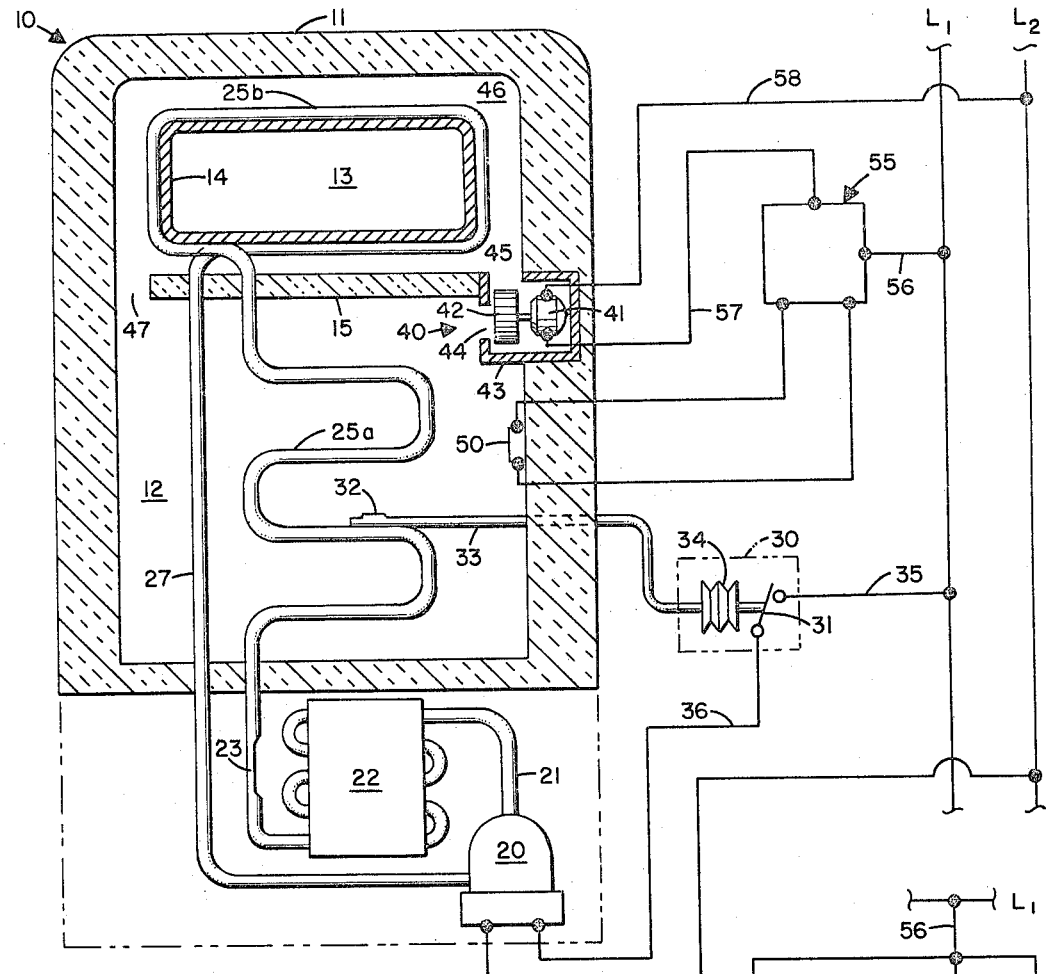
FIG. 1 is a schematic illustration of a typical refrigerator including a fan motor controlled by a control circuit embodying this invention.

Although condition responsive motor speed control circuits embodying this invention may be utilized to control electric motors for other purposes, the invention will be described hereinafter with reference to speed control of air circulating fans in refrigerators. Referring to FIG. 1, there is schematically illustrated a domestic refrigerator 10 including a fan having a motor controlled by circuit means embodying this invention. It will be understood that the refrigerator 10 itself forms no part of the invention but is described to provide a better understanding of control circuits embodying the invention and practical uses thereof.

The refrigerator 10 comprises insulating wall means 11 defining a food compartment 12 in which temperatures are normally maintained above freezing. A freezing compartment 13 is defined within a suitable enclosure 14 disposed in the upper portion of the refrigerator 10, in spaced relation to the insulating wall 11 and separated from the food compartment 12 by an insulating wall 15.

The refrigerator 10 further comprises a conventional compressor-condenser-evaporator refrigerating system including a motor-compressor 20 which discharges hot compressed refrigerant through its discharge tube 21 into a condenser 22 for cooling and liquification. The liquified refrigerant passes from the condenser 22 through a capillary 23, or restricting means equivalent thereto, into a primary evaporator section 25a which is conveniently in the form of a serpentine tubing disposed in or adjacent the rear wall of the food compartment 12. Refrigerant expanding in the evaporator section 25a cools the food compartment 12 and passes into a secondary evaporator section 25b which is in the form of a coil about the freezing compartment enclosure 14. Continuing the evaporation of the refrigerant of the evaporator section 25b cools the freezing compartment 13 to a temperature substantially below freezing. The evaporated refrigerant is returned by a suction line 27 to the intake side of the motor-compressor 20 to complete the circuit.

The motor-compressor 20 is thermostatically cycled by a temperature responsive switch 30 having contacts 31 which are opened and closed in response to predetermined minimum and maximum temperatures of the primary evaporator section 25a as sensed by a temperature sensing bulb 32. The bulb 32 is connected by a capillary tube 33 to an expansible element or bellows 34. The bulb 32, capillary tube 33, and bellows 34 preferably contain a suitable volatile fluid which condenses and vaporizes at a predetermined temperature to effect opening and closing of the contacts 31 in response to the coldest part of the fluid containing system, namely the bulb 32, as will be well understood by those skilled in the art to which the invention pertains. The contacts 31 form a part of a compressor energizing circuit which may be traced from the power line L1 through a conductor 35, contacts 31, a conductor 36, motor-compressor 20, and a conductor 37 to the power line L2.

In order to prevent short cycling of the motor-compressor 20, it is desirable that the thermostatic switch 30 is of a type having a substantial temperature differential between the cut-in and cut-out temperatures thereof. Accordingly, the temperature of the evaporator section 25a will at times vary considerably from the desired average temperature of the food compartment 12.

In order to maintain a more even temperature within the food compartment 12, there is provided a fan or blower generally indicated at 40, comprising a shaded pole electric motor 41 for driving a squirrel cage type air impeller 42. The fan 40 further comprises a housing 43 having an air inlet 44 in communication with the food compartment 12, and an air outlet 45 in communication with a space 46 in contact with the secondary evaporator section 25b prior to the return of air to the food compartment through a suitable passage 47. The speed of the fan 40 is controlled in response to the temperature of the food compartment 12 as sensed by a temperature responsive resistor or thermistor 50 mounted in the food compartment.

The thermistor 50 forms part of an electronic control circuit, indicated generally at 55 in FIG. 1 and explained more fully hereinafter, which regulates the speed of the motor 41 of fan 40 as necessary to maintain a predetermined temperature within the food compartment 12 irrespective of the variations in temperature of the evaporator section 25a. This electronic control circuit regulates a flow of motor current which may be traced from the power line L1 through a conductor 56, through circuit 55, through a conductor 57, motor 41 and a conductor 58, to the power line L2.

Figure 2:
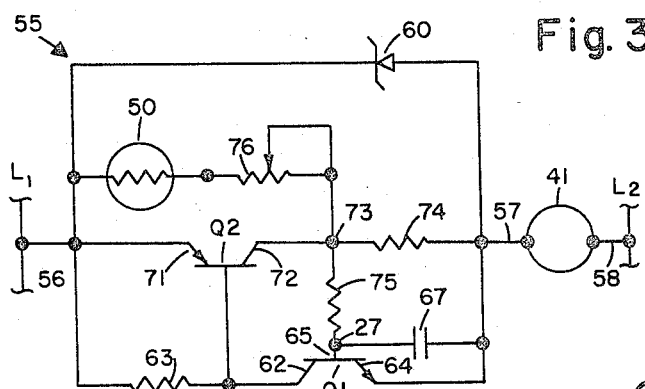
FIG. 2 is a diagrammatic illustration of a preferred form of control circuit embodying the invention.

Referring now to FIG. 2, there is illustrated therein a preferred embodiment of the control circuit 55. It will be understood that the power lines L1 and L2 carry suitable alternating current such as the usual 115 volt AC domestic current supply. The circuit 55 comprises a Zener diode 60 connected in series with the motor 41 between power lines L1 and L2 by the conductors 56, 57 and 58. During those half cycles when the power line L1 is negative with respect to the power line L2, referred to hereinafter as negative half cycles, electric current flow may be traced from the power line L2 through the conductor 58, motor 41, conductor 57, Zener diode 60, and conductor 56 to the power line L1. During the half cycles when the power line L1 is positive with respect to the power line L2, referred to hereinafter as positive half cycles, the wave shape of flow of current to the motor 41 through the diode 60 is greatly distorted thereby. Therefore, in the absence of other flow paths for current during the positive half cycles, the motor 41 would be supplied with current of severely distorted wave shape and would operate at a relatively low speed.

The circuit 55 comprises means for by-passing the diode 60 at a predetermined time during each positive half cycle, the time being determined by the temperature sensed by thermistor 50, so that as the temperature sensed increases, the time of by-pass occurs earlier in the positive half cycles, thereby supplying the motor 41 with correspondingly greater usable power and effecting correspondingly greater fan speed.

To this end, the circuit 55 includes a first transistor Q1 of the NPN type having its collector 62 connected through a resistor 63 and conductor 56 to the power line L1, and having its emitter 64 connected to the conductor 57. The base 65 of the transistor Q1 is connected to one side of a time delay capacitor 67, the other side of which is connected to the conductor 57.

Another transistor Q2, which is of the PNP variety and is connected in complementary relation to transistor Q1, has its base 70 connected at the connection between the resistor 63 and the collector 62 of transistor Q1, its emitter 71 connected to the conductor 56, and its collector 72 connected to the junction 73 of resistors 74, 75 and the variable resistor 76. The resistor 74 is connected to the conductor 57, while the resistor 75 is connected to the connection 77 between the base 65 of transistor Q1 and the capacitor 67, and the variable resistor 76 is connected in series with the thermistor 50 between the conductor 56 and the junction 73.

As mentioned above, during the negative half cycles the diode 60 conducts current, while during the positive half cycles the diode 60 greatly distorts the current flow therethrough to the motor 41. As the diode 60 distorts the flow of current through the motor, the conductor 56 becomes positive with respect to conductor 57, causing the capacitor 67 to become charged through the thermistor 50, variable resistor 76, and resistor 75 at a time rate depending upon the values of the capacitor and the resistance through which it is changed. As the capacitor becomes charged and the base 65 of transistor Q1 is made more positive than the emitter 64, the transistor Q1 becomes conductive between the collector 62 and the emitter 64 thereof. This conductivity of the transistor Q1 draws base current from the transistor Q2, biasing that transistor to a conductive condition between its emitter 71 and collector 72. The increased conductivity of the transistor Q2 by-passes the thermistor 50 and variable resistor 76, thereby increasing the base current of the transistor Q1 and resulting in convulsive switching of both transistors to their fully conductive or "on" conditions. When the transistors Q1 and Q2 are switched on, the diode 60 is by-passed by the transistors to the motor 41.

The time during the positive or blocked half cycles at which the switching of the transistors Q1 and Q2 to an on condition takes place may be determined by the setting of the variable resistor 76 and by the temperature sensed by the thermistor 50. As the thermistor 50 senses an increase in temperature, for example in the food compartment 12, its conductivity increases so that the capacitor 67 becomes charged at an earlier time in the blocked half cycle, resulting in correspondingly earlier switching of the transistor Q1 and Q2 to their on conditions and an increase in average current flow to the motor 41. The increased motor current results in faster operation of the motor 41 and increased circulation of air over the relatively cold evaporator section 25b and into the food compartment 12. It will be recognized that the fan or blower 40 will thereby seek a speed in response to the temperatures sensed by thermistor 50 which will circulate sufficient air to tend to maintain a relatively even temperature in the food compartment 12 irrespective of comparatively wide temperature variations at the primary evaporator section 25a. It will be understood that the temperature sought to be maintained by the circulation of air may be selected by adjustment of the variable resistor 76 which may be provided with a suitably calibrated control.

Because the operation of the transistors Q1 and Q2 controlling the motor current flow during the half cycles blocked by the diode 60 is in the nature of switching, and because the diode is efficient in blocking current flow, there will be little heat loss in the circuit 55, and, because of an absence of mechanical parts such as vibrating contacts, the circuit 55 will be exceptionally reliable and uniform in operation. The use of a Zener diode as the diode 60 is effective to protect the transistors Q1 and Q2 against spurious voltages as the Zener diode may be selected to have a break-down voltage within the safe operating range of the transistors.

Figure 3:
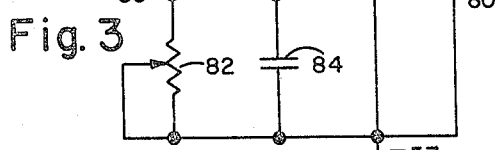
FIG. 3 is a diagrammatic illustration of another form of control circuit embodying the invention.

An alternative embodiment of the invention is illustrated in FIG. 3 in which a diode 80 is connected between the conductors 56 and 57 and passes current during negative half cycles and blocks current during positive half cycles. In this embodiment the thermistor 50 and the variable resistor 82 are connected between the conductors 56 and 57 to form a voltage divider, the junction 83 of which is connected to one side of the capacitor 84 and to the control connections or gate 85 of a silicon controlled rectifier 86. The other side of the capacitor 84 is connected to the conductor 57 so that during positive half cycles when the current flow is blocked by the diode 80, the capacitor 84 will be charged through the thermistor 50 at a rate determined by the temperature sensed by the thermistor and by the setting of the resistor 82. At a time during the half cycle when the capacitor 84 is charged to a point which will bias the controlled rectifier 86 to a conductive condition, controlled rectifier 86 by-passes the current blocking diode 80 to conduct the remainder of the positive half cycle current to the motor 41. As in the prior embodiment, the temperature sensed by the thermistor 50 determines the time during the positive half cycle at which the blocking or distorting semi-conductor is by-passed, and hence determines the operating speed of the motor 41.

Although the invention has been described in considerable detail and with reference to specific control circuits embodying the invention, it will be understood that the invention is not limited thereto, but rather the invention includes all those modifications, adaptations, substitutions, and uses as are reasonably embraced by the scope of the claims hereof.

Having described my invention, I claim:

1. In a heat pump system comprising two heat exchangers connected in a circuit whereby one exchanger absorbs heat and the other discharges heat, electric motor driven fan means for directing a heat exchange medium over one of said heat exchangers including an induction motor and a fan member, and means to control the speed of said induction motor comprising switch means operable between a first condition wherein said switch means conducts current to said motor driven fan means and a second condition wherein said switch means is ineffective to conduct current to said fan means and actuating means for operating said switch means between said conditions, said actuating means including a resistance element responsive to temperature of one of said heat exchangers and a capacitance element connected thereto with said resistance element and said capacitance element cooperating to provide a build-up of voltage at a rate which is dependent upon temperature of one of said exchangers, with said voltage effective to control operation of said switch means at a predetermined time which is dependent upon said temperature and independent of the speed of said motor driven fan means.

2. A heat pump as set forth in claim 1 and wherein said actuating means further includes a switch element actuated by a predetermined signal voltage produced by said resistance and capacitance elements and wherein said switch element is operable to control operation of said switch means from said second to said first condition.

3. A thermostatic speed control for a shaded pole motor comprising:
(a) a diode for connection in series with said motor across a source of alternating current, said diode being operative to pass energizing current flow to said motor one-half of each current cycle and to block current flow during opposite half cycles;
(b) semi-conductor switching means connected in parallel with said diode for passing current flow to said motor when biased to a conductive condition during said opposite half cycles; and
(c) a biasing circuit for said semi-conductor switching means, said biasing circuit comprising a thermistor and a capacitor connected to bias said semi-conductor switching means to a conductive condition at a time in each opposite half cycle depending on the charging rate of said capacitor through said thermistor, said charging rate in turn depending upon the temperature sensed by said thermistor.

4. A thermostatic speed control as defined in claim 3 and wherein said semi-conductor switching means comprises first and second transistors in complementary coupled relation.

5. A thermostatic speed control as defined in claim 3 and wherein said semi-conductor switching means comprises a silicon controlled rectifier.

6. In a heat pump system including first and second heat exchangers, fan means operable to direct a flow of air over one of said heat exchangers including a blower member and an induction motor energized from an AC power supply and drivingly connected to said blower member, switch means connected in circuit with said motor for controlling the power applied thereto, and control circuity for operating said switch means between conductive and nonconductive conditions, said circuity including a temperature sensing circuit having a temperature responsive resistor in heat exchange relation with said one heat exchanger and resistance means serially connected with said temperature responsive resistor, said temperature sensing circuit effective to provide instantaneous voltages at a point therein having amplitudes which vary according to temperature sensed by said temperature responsive resistor, a capacitor connected in said control circuitry and charged at a rate controlled by the instantaneous voltage at said point in said sensing circuit, said capacitor coupled to said switch means and effective to discharge at a time in a cycle of said power supply dependent upon said sensed temperature, said capacitor being operable to render said switch means conductive upon discharge thereof whereby the operating speed of said induction motor is varied in accordance with sensed temperature.

7. A heat pump system as set forth in claim 6 wherein said capacitor discharges through a conductive path including a control electrode of a transistor, said conductive path being coupled to said switch means and effective when conducting to render said switch means operative to provide energizing current to said induction motor.

References Cited

UNITED STATES PATENTS

| | | | |
|---|---|---|---|
| Re. 25,203 | 7/1962 | Momberg et al. | 318—246 |
| 2,783,423 | 2/1957 | Streater et al. | 318—223 X |
| 3,165,688 | 1/1965 | Gutzwiller | 318—331 X |
| 3,225,280 | 12/1965 | Happe et al. | 318—345 X |

OTHER REFERENCES

D. R. Grafham: Using Low Current SCR's and Silicon Controlled Switches, G.E. application note 200.19, March 1962, pages 10–12.

ORIS L. RADER, *Primary Examiner.*

J. J. BAKER, *Assistant Examiner.*